UNITED STATES PATENT OFFICE.

WILLIAM GEORGE WHITE, OF LONDON, ENGLAND.

POLYCHROMATIC-PRINTING BLOCK.

SPECIFICATION forming part of Letters Patent No. 375,433, dated December 27, 1887.

Application filed January 18, 1886. Serial No. 188,969. (No specimens.) Patented in England October 22, 1884, No. 14,020.

*To all whom it may concern:*

Be it known that I, WILLIAM GEORGE WHITE, a subject of the Queen of Great Britain, residing at 153 Queen Victoria Street, in the city of London, England, have invented certain new and useful Improvements in Polychromatic-Printing Blocks, (for which I have obtained Letters Patent in Great Britian, No. 14,020, dated October 22, 1884,) of which the following is a specification.

This invention relates to that system of color-printing known as the "polychromatic simultaneous system," in which the printing-block is built up of suitably-prepared materials containing the various colors which the design requires, and in which the printing-block so built up of coloring materials imparts a portion of its own substance to the fabric or surface to which it is applied.

By my improvements I dispense with the fatty compound with which heretofore the coloring-matters have been incorporated to form printing-blocks of this nature, and in lieu thereof I employ as the basis of the blocks paraffine reduced to the consistency required by mixing it with a suitable vegetable oil, preferably boiled linseed, poppy, or maw oil.

The following composition is suitable: Paraffine, eighty parts; boiled linseed-oil, forty-five parts.

Instead of using the ordinary pigment colors for mixing with the above compound, constituting the basis of the blocks, I prefer to use color made and mixed with the basis, as follows:

Blue color I prepare with the following ingredients: Water, sixty parts; sal-ammoniac, twelve parts; prussiate of tin, sixty parts; yellow prussiate of potash, (ferro-cyanide of potassium,) twelve parts; red prussiate of potash, (ferri-cyanide of potassium,) six parts; tartaric acid, eighteen parts; oxalic acid, one and one-fourth part. The mixture thus made I mix with alumina—say one pound of alumina and one-half pint of above mixture. The whole, being thoroughly incorporated, is laid on suitable vessels and dried. After drying the prepared colors are finally ground and mixed with the basis above described in the proportion of, say, one pound of color to one and one-half pound of basis. The whole is again passed through a fine-set grinding-mill.

Green color I prepare with the ingredients following: Tannin-liquor, fifty-four parts; protochloride of tin crystals, one part; tin-pulp, nine parts; yellow prussiate of potash, ten parts; tartaric acid, nine parts; extract of indigo, two and one-fourth parts. The above are mixed with alumina in the proportions stated above, and afterward with the basis, as already described.

Yellow color I prepare with the ingredients following: Persian-berry liquor, thirty-six parts; alum, two parts; protoxide of tin, four and one-half parts. These are then mixed with one pint of liquor to one pound of pipe-clay, dried, and finally ground. One pound of color is ground and mixed with one and one-half pound of the basis.

Red color I prepare with the ingredients following: Sapan-wood liquor, eighteen parts; tannin-liquor, four and one-half parts; nitrate of alumina, four parts; water, nine parts; oxalic acid, one part; alum, three-fourths of a part; chlorate of potash, one-fourth of a part. This is then mixed with one pint of above color to one pound of pipe-clay, dried, ground, and mixed with the basis—say one pound of color for two pounds of mass.

Black color I prepare with the ingredients following: Logwood-liquor, fifty-eight and one-half parts; tannin-liquor, thirteen and one-half parts; acetic acid, eleven parts; water, four and one-half parts; chlorate of potash, one part; aceto-nitrate of chrome, nine parts. One pound of pipe-clay is thoroughly dissolved in pyrolignite of iron. Added to this is one pint of the above black liquor. This is then dried, ground, and mixed with the basis—say one pound of color for two pounds of mass.

The block is prepared from the variously-colored paraffine compounds by suitably shaping the pieces and fitting them together, according to the design, in the usual way.

The cloths to be printed, after being properly mordanted, are slightly damped with turps before printing. After printing, the goods are passed through a weak benzine bath to extract the oil; then aged and steamed in the ordinary way, and washed and soaped to remove the pipe-clay or earthy matter, thus leaving only the dye on the cloth.

What I claim is—

A polychromatic-printing block composed, in about the proportions specified, of paraffine mixed with vegetable oil and with coloring-matters, substantially as set forth.

WILLIAM GEORGE WHITE.

Witnesses:
  JNO. DEAN,
  WALTER J. SKERTEN,
  *Both of 17 Gracechurch Street, London.*